(12) United States Patent
Scheerer et al.

(10) Patent No.: US 12,049,365 B2
(45) Date of Patent: Jul. 30, 2024

(54) CLEANING DEVICE FOR A CONVEYOR BELT CONTAMINATED WITH COATING AGENT RESIDUES, COATING DEVICE, METHOD FOR CLEANING A CONVEYOR BELT CONTAMINATED WITH COATING AGENT RESIDUES

(71) Applicant: Robert Burkle GmbH, Freudenstadt (DE)

(72) Inventors: Marcel Scheerer, Freudenstadt (DE); Michael Hoffer, Lossburg (DE); Martin Brummerstadt, Alpirsbach (DE)

(73) Assignee: Robert Bürkle GmbH, Freudenstadt (DE)

( * ) Notice: Subject to any disclaimer, the term of this patent is extended or adjusted under 35 U.S.C. 154(b) by 105 days.

(21) Appl. No.: 18/089,642

(22) Filed: Dec. 28, 2022

(65) Prior Publication Data

US 2023/0202768 A1 Jun. 29, 2023

(30) Foreign Application Priority Data

Dec. 28, 2021 (DE) ...................... 10 2021 006 373.2
Dec. 2, 2022 (EP) ..................................... 22211192

(51) Int. Cl.
*B65G 45/22* (2006.01)
*B65G 45/12* (2006.01)
(Continued)

(52) U.S. Cl.
CPC ............. *B65G 45/22* (2013.01); *B65G 45/12* (2013.01); *B65G 45/14* (2013.01); *B65G 45/24* (2013.01); *B65G 45/26* (2013.01)

(58) Field of Classification Search
CPC ........ B65G 45/22; B65G 45/12; B65G 45/14; B65G 45/24; B65G 45/26; B05B 14/20
See application file for complete search history.

(56) References Cited

U.S. PATENT DOCUMENTS 3,888,345 A * 6/1975 Mitchell ................ B65G 45/20
198/494
4,860,883 A 8/1989 Knaul et al.
(Continued)

FOREIGN PATENT DOCUMENTS

CN 107855249 8/2020
EP 0266627 A1 1/1992
(Continued)

*Primary Examiner* — Mark A Deuble
(74) *Attorney, Agent, or Firm* — Volpe Koenig

(57) ABSTRACT

A cleaning device for a residue contaminated conveyor belt includes a roller arranged below the conveyor belt such that the lateral surface thereof contacts a lower strand of the conveyor belt, and a cleaning belt is arranged below the roller. The lateral surface of the roller contacts an upper strand of the cleaning belt, which is tilted relative to a main conveying direction at the upper strand relative to a longitudinal roller axis. A dispensing device on and/or above the cleaning belt feeds a solvent thereon. The dispensing device and the cleaning belt are relatively arranged such that the solvent from the cleaning belt is conveyed by a conveying movement of the cleaning belt into a region in which the cleaning belt contacts the roller, which via a rotational movement, at least partially picks up the solvent located on the cleaning belt and dispenses it onto the conveyor belt.

18 Claims, 5 Drawing Sheets

(51) Int. Cl.
    *B65G 45/14*     (2006.01)
    *B65G 45/24*     (2006.01)
    *B65G 45/26*     (2006.01)

(56) References Cited

U.S. PATENT DOCUMENTS

| | | | |
|---|---|---|---|
| 6,447,609 B1 * | 9/2002 | Potthoff | B65G 45/14 |
| | | | 118/322 |
| 8,579,102 B2 * | 11/2013 | Bryl | B65G 45/22 |
| | | | 198/494 |
| 8,727,101 B2 * | 5/2014 | Chiarini | B65G 45/10 |
| | | | 198/497 |
| 2001/0023814 A1 | 9/2001 | Franzoni et al. | |
| 2010/0243410 A1 | 9/2010 | Hall et al. | |

FOREIGN PATENT DOCUMENTS

| | | |
|---|---|---|
| EP | 1964795 A1 | 9/2008 |
| GB | 2484575 A | 4/2012 |

* cited by examiner

CLEANING DEVICE FOR A CONVEYOR BELT CONTAMINATED WITH COATING AGENT RESIDUES, COATING DEVICE, METHOD FOR CLEANING A CONVEYOR BELT CONTAMINATED WITH COATING AGENT RESIDUES

CROSS-REFERENCE TO RELATED APPLICATIONS

This application claims the benefit of European Patent Application No. 22211192.4, filed Dec. 2, 2022 and German Patent Application No. 10 2021 006 373.2, filed Dec. 28, 2021, both of which are incorporated herein by reference as if fully set forth.

TECHNICAL FIELD

The invention relates to a cleaning device for a conveyor belt contaminated with coating agent residues, to a coating device, and to a method for cleaning an endlessly revolving conveyor belt contaminated with coating agent residues.

BACKGROUND

To improve the surface properties of a wooden workpiece, for example an item of furniture, it can be provided with a coating agent during or after its production. The coating agent can be, for example, varnish, paint or for instance stain.

For the coating, use is made of coating devices in which the workpiece is conveyed by means of a conveyor belt and, in the meantime, is provided with the coating agent by means of a plurality of spray units. It is desirable here for both the surface of the workpiece facing the spray units and the side edges of said workpiece to be coated.

During the coating operation, it is not possible to avoid the conveyor belt being contaminated with coating agent residues. So that the coating agent residues do not form a dry encrustation on the conveyor belt and thereby damage the latter, it is desirable to be able to clean the conveyor belt after the coating operation and to free it from the coating agent residues.

EP 2 537 595 B1 discloses a cleaning device for a conveyor belt contaminated with coating agent residues. Said cleaning device comprises a roller, the lateral surface of which is provided for frictional contact with the conveyor belt. By means of a relative movement between the lateral surface of the roller and the conveyor belt, the coating agent residues located on the conveyor belt are scraped off by means of the roller. A doctor blade is arranged on a side of the roller facing away from the conveyor belt and is in mechanical frictional contact with the lateral surface of the roller. The doctor blade serves to scrape off the coating agent residues located on the roller and to guide them onto a cleaning belt. The cleaning belt is configured as an endlessly revolving belt with a lower strand and an upper strand. The quantity of coating agent placed onto the cleaning belt is conveyed by means of a conveying movement of the cleaning belt to an end-side region of the cleaning roller and can be collected there.

In the case of the cleaning device known from EP 2 537 595 B1, it has to be continuously ensured that there is a uniform and high contact pressure between the doctor blade and the roller. In addition, it has to be ensured that there is a high differential speed between the conveyor belt and the roller with the shared mechanical contact. However, it is problematic here that the doctor blade and the roller are mechanically greatly stressed as a result of the high contact pressure and the high differential speed and are therefore subject to a high degree of wear. This is disadvantageous in particular since it can be very costly and complicated to exchange the conveyor belt in the coating device.

In the worn state, only a comparatively low quantity of coating agent can be scraped off the roller by means of the doctor blade even in the event of a high contact pressure and high differential speed. The quantity of coating agent residues not scraped off remains here on the roller and passes again onto the conveyor belt. This is firstly problematic since the desired cleaning effect cannot be continuously achieved at the conveyor belt. Secondly, the coating agent residues are typically distributed nonuniformly on the roller. Accordingly, a nonuniform friction occurs between roller and conveyor belt, as a result of which both the wear of the components of the cleaning device and of the conveyor belt is increased.

SUMMARY

The invention is based on the object of proposing a cleaning device of the type mentioned at the beginning, a coating device having such a cleaning device, and a method, by means of which cleaning device, coating device and method a conveyor belt contaminated with coating agent residues can be reliably cleaned and the wear of the components used here is reduced.

The object is achieved by a cleaning device with one or more of the features disclosed herein. Advantageous developments are found below and in the claims. The object is also achieved by a coating device as well as a method having one or more of the features disclosed herein.

The cleaning device according to the invention is conceived for an endlessly revolving conveyor belt contaminated with coating agent residues and has, in a manner known per se, at least one first roller which is provided to be arranged below the conveyor belt in such a manner that the lateral surface thereof is in contact with a lower strand of the conveyor belt. A likewise endlessly revolving cleaning belt is arranged below the first roller.

The cleaning device differs from the previously known cleaning device in that the lateral surface of the first roller is in contact with an upper strand of the cleaning belt. The cleaning belt here has a main conveying direction during a conveying movement at the upper strand. The cleaning belt is arranged in such a manner that it is tilted with the main conveying direction in relation to a longitudinal axis of the first roller. In addition, at least one first dispensing device is provided on the cleaning belt and/or above the cleaning belt in order to feed a first solvent onto the cleaning belt in such a manner that it is conveyed by means of the conveying movement of the cleaning belt along the main conveying direction into a region in which the cleaning belt is in contact with the first roller. The first roller is designed and arranged here in such a manner that, by means of a rotational movement, said roller at least partially picks up the first solvent located on the cleaning belt and dispenses it onto the conveyor belt.

The invention is based on the finding that the cleaning belt can be brought into contact, in particular frictional contact, with the lateral surface of the first roller in order to pick up coating agent residues located on the first roller and to be able to remove them in the main conveying direction. In comparison to a doctor blade, the coating agent residues are abraded more gently from the first roller such that the latter is subject to a lower degree of wear. In particular, the materials from which the lateral surface of the first roller and/or the cleaning belt are composed or with which they are coated can be selected so as to be able to set the friction between the first roller and the cleaning belt in accordance with requirements.

In addition, a further finding is that the cleaning belt can be used not solely so as to pick up and be able to remove the coating agent residues picked up from the first roller. On the contrary, the cleaning belt can also serve to supply solvent which can be picked up on the lateral surface of the first roller and dispensed onto the conveyor belt. In the case of the cleaning device according to the invention, there is therefore overall a high degree of functional integration since the cleaning belt carries out a plurality of functions simultaneously. This results in a simple design of the cleaning device.

It is possible by means of the cleaning device according to the invention to provide the conveyor belt with large quantities of first solvent as required, as a result of which the coating agent residues located thereon can be loosened. The first solvent preferably has a lubricating effect, and therefore the friction between the first roller and the conveyor belt can be reduced. As a result, firstly, a good cleaning effect can therefore be achieved. Secondly, the wear of the first roller and the conveyor belt can be further reduced, as a result of which the good cleaning effect can also be continuously ensured.

The conveyor belt is configured in a manner known per se as an endlessly revolving and preferably elastic belt which can be guided and driven by means of a plurality of deflecting pulleys. In particular, the conveyor belt also has an upper strand in addition to the lower strand.

The first roller of the cleaning device is provided in particular to be arranged in relation to the conveyor belt in such a manner that its longitudinal axis is oriented substantially orthogonally to a translation direction of the conveyor belt in the region of the lower strand. However, it also lies within the scope of the invention that the first roller can be tilted with its longitudinal axis in relation to the translation direction of the conveyor belt in the region of the lower strand, i.e. at an angle of between 0 and 90 degrees.

The first roller can comprise a cylindrical steel core and preferably a chrome-plated lateral surface. A ceramic coating on the lateral surface of the first roller is also conceivable. Alternatively, the steel core can be encased with a rubber layer. The rubber layer can be an antistatic rubber layer with which static charging of the first roller in relation to the conveyor belt can be prevented.

The cleaning belt is likewise configured as an endlessly revolving and preferably elastic belt and, in addition to the upper strand, in particular also has a lower strand. The cleaning belt can have at least two deflecting pulleys, of which at least one deflecting pulley can be set into motion by means of a cleaning belt drive in order to drive the cleaning belt. This makes it possible to set the conveying movement with the main conveying direction at the upper strand.

According to the invention, the cleaning belt is tilted with its main conveying direction at the upper strand in relation to the longitudinal axis of the first roller such that the main conveying direction and the longitudinal axis therefore enclose an angle, the value of which lies between 0 and 90 degrees. That is to say that the main conveying direction is not directed orthogonally to the longitudinal axis of the first roller and also does not run parallel thereto. In comparison to a parallel orientation between the main conveying direction of the cleaning belt at the upper strand and the longitudinal axis of the first roller, said main conveying direction and longitudinal axis can enclose an angle of +5 degrees or −5 degrees, for example.

The cleaning device is preferably provided to be arranged in relation to the conveyor belt in such a manner that, in the region of its upper strand, the cleaning belt is spaced apart substantially plane-parallel to the conveyor belt in the region of its lower strand. In particular, the region of the upper strand of the cleaning belt is oriented horizontally. It is thereby possible to place the first solvent onto the cleaning belt in such a manner that it can be supplied substantially correspondingly to the main conveying direction of the first roller. In particular, the solvent is not deflected transversely with respect to the main conveying direction, for example, as a consequence of the effect of gravity and an inclination of the cleaning belt. The first roller can thereby be reliably provided with solvent.

The first dispensing device serves according to the invention to place the first solvent onto the cleaning belt. The first solvent can be a liquid medium which has a loosening effect for the coating agent residues located on the conveyor belt and has, in addition, simultaneously a lubricating, i.e. friction-reducing effect for the intended contact between the first roller and the conveyor belt. In particular, the first solvent can comprise a rinsing agent or a cleaning agent or can be substantially composed of rinsing agent or cleaning agent. It can also be a recycled solvent which is mixed with coating agent residues and nevertheless can have a cleaning effect for the conveyor belt. The coating agent residues can be present here dissolved in the first solvent.

In a simple embodiment, the first dispensing device can comprise a fluid-guiding dispensing element with a dispensing opening. The dispensing element is preferably configured as a hollow-cylindrical tubular segment and is positioned here in relation to the cleaning belt in order, when the first solvent is dispensed, to set a solvent path on the upper strand of the cleaning belt as a result of the conveying movement of the cleaning belt. The solvent path is preferably oriented substantially correspondingly to the main conveying direction of the cleaning belt and extends between the dispensing device and the region in which the first roller is in contact with the cleaning belt.

By means of the conveying movement of the cleaning belt, the first solvent placed onto the cleaning belt is conveyed into the region in which the first roller and the cleaning belt are in contact. As a result of the rotational movement of the first roller and the conveying movement of the cleaning belt, the first roller and the cleaning belt can be at least temporarily in frictional contact with each other.

The cleaning device preferably has a roller drive which is designed to set the first roller into the rotational movement. The invention is not restricted to one direction of rotation of the first roller in respect of the rotational movement. In particular, the direction of rotation of the rotational movement of the first roller can be set independently of the main conveying direction of the cleaning belt in order, as desired, to pick up the first solvent and to be able to dispense it onto the conveyor belt. It therefore lies within the scope of the invention that, during the rotational movement, the lateral surface of the first roller, in the region of contact with the cleaning belt, has a superficial tangential speed which is at least partially directed in or counter to the main conveying direction of the cleaning belt.

In a configuration in which the superficial tangential speed of the first roller is at least partially directed counter to the main conveying direction of the cleaning belt, the first solvent can be picked up in an opposed movement of the cleaning belt on the lateral surface of the first roller and placed onto the conveyor belt as a consequence of the rotational movement of the first roller. Preferably, there is no further application of solvent to the first roller in a region between the cleaning belt and the conveyor belt.

In a configuration in which the superficial tangential speed of the first roller is at least partially directed in the main conveying direction of the cleaning belt, the first solvent can first of all be conveyed between the first roller and the cleaning belt and then placed onto the conveyor belt by means of the rotational movement of the first roller. For this purpose, the first roller and the cleaning belt can be positioned with respect to each other in such a manner that the region in which the first roller and the cleaning belt are in contact is not configured in a sealing manner, i.e. is permeable to substances. This can be realized, for example, depending on a contact pressure force between the first roller and the cleaning belt, which can be set so as to promote a permeability of the first solvent in the region of the frictional contact. Additionally or alternatively, the first roller can be coated on its lateral surface and/or the cleaning belt on its surface in such a manner that the above-explained substance permeability in the joint contact is set or at least promoted. In the event of a synchronous rotational movement of the first roller in relation to the main conveying direction of the cleaning belt, the first solvent can pass to both sides of the contact between the first roller and the cleaning belt, as a result of which in particular harmful dried encrustations of abraded coating agent residues on the cleaning belt can be reduced or even entirely prevented.

The superficial tangential speed of the first roller can preferably be set in such a manner that it corresponds in value to the conveying speed of the cleaning belt in the main conveying direction or differs therefrom. In particular, the superficial tangential speed of the first roller can be smaller or greater than the conveying speed of the cleaning belt in the main conveying direction or of a portion of the conveying speed, which portion runs parallel to the superficial tangential speed of the first roller.

The orientation of the rotational movement of the first roller can basically also be freely set independently of the translation movement of the conveyor belt. It therefore lies within the scope of the invention that a superficial tangential speed at the lateral surface of the first roller and the superficial conveyor belt speed of the conveyor belt in the intended contact between the first roller and the conveyor belt are directed substantially parallel to each other, in particular in the event of an orthogonal orientation of the longitudinal axis of the first roller in relation to the translation direction of the conveyor belt.

In particular, the tangential speed at the lateral surface of the first roller can be directed at least partially in an opposed manner to the superficial conveyor belt speed of the conveyor belt. As a result, the first solvent which is located on the first roller can be placed onto the conveyor belt by means of two synchronous movements between the first roller and the conveyor belt and at the same time the coating agent residues located on the conveyor belt removed.

In an advantageous development, the rotational movement of the first roller is, however, oriented in such a manner that, in the region of contact with the conveyor belt, the first roller has a superficial tangential speed which is at least partially directed in the same direction as a translation direction of the conveyor belt at its lower strand.

According to the above-described development, the first roller is provided for a synchronous movement in relation to the conveyor belt. This is a reversal of conventional design practice which provides a synchronous movement between the first roller and a conveyor belt to be cleaned.

The advantageous development is based on the finding already described above that the coating agent residues to be removed are conventionally distributed inhomogeneously on the conveyor belt. In the event of a synchronous rotational movement of the first roller, this leads in the region of the frictional contact between the first roller and the conveyor belt to an increased friction at certain locations, as a result of which both the first roller and the conveyor belt become worn.

By means of the synchronous rotational movement of the first roller in relation to the translation direction of the conveyor belt during its translation movement, the first solvent can be placed in a large quantity onto the conveyor belt and initially distributed uniformly over the entire region of the frictional contact. As a result, the coating agent residues can be loosened, and therefore a more homogeneous distribution of the coating agent residues can be achieved. The synchronous rotational movement of the first roller in relation to the translation direction of the conveyor belt is also advantageous for the cleaning belt since the loosened coating agent residues can be placed by the first roller onto the cleaning belt with a homogeneous distribution. The wear of the cleaning belt can thereby also be reduced.

In addition, it is of particular advantage if the contact which can be formed between the first roller and the conveyor belt is not designed in a sealing manner, i.e. permeable to substances. The first roller can therefore be positionable in relation to the conveyor belt in such a manner that the first solvent can be conveyed between the first roller and the conveyor belt, in particular in the region of contact thereof. By introducing the first solvent between the conveyor belt and the first roller, the friction in the common contact is reduced, as a result of which the wear of the first roller and of the conveyor belt is reduced and a permanently good cleaning effect achieved. In addition, the service lives of the first roller and of the conveyor belt are increased.

The setting of a non-sealing, i.e. substance-permeable, contact between the first roller and the conveyor belt can be realized depending on a contact pressure force which is preferably exerted on the first roller. Said contact pressure force can preferably be set in order to be able to at least indirectly set the permeability of the contact between the first roller and the conveyor belt for the first solvent.

In contrast to the previously known cleaning device, the first roller therefore does not have to serve solely as a cleaning roller for removing coating agent residues. Nevertheless, it lies within the scope of the invention that the first roller can be configured as a cleaning roller. In addition, the first roller can be configured exclusively as an application roller in order to provide the conveyor belt with as large a quantity of solvent as possible.

The superficial tangential speed at the lateral surface of the first roller can preferably be settable in such a manner that it corresponds in terms of value to the translation speed of the conveyor belt in the translation direction or differs therefrom. In particular, the superficial tangential speed can be smaller or greater than the translation speed of the conveyor belt in the translation direction or a portion thereof which is directed parallel to said tangential speed.

In one possible embodiment, in which the first roller is provided to be arranged with its longitudinal axis orthogonally to the translation direction of the conveyor belt at the lower strand, the superficial tangential speed, when considered vectorially, faces entirely in the same direction as the translation direction of the conveyor belt. In another possible embodiment, in which the first roller is provided to be arranged tilted with its longitudinal axis in relation to the translation direction of the conveyor belt at the lower strand, the superficial tangential speed at the lateral surface of the first roller, when considered vectorially, has a speed portion which faces in the same direction as the translation direction of the conveyor belt.

In an advantageous development, the first solvent is substantially composed of a coating agent. The coating agent is in particular varnish and/or paint and/or stain. The first solvent is preferably composed of the coating agent, the coating agent residues of which are intended to be eliminated from the conveyor belt.

The application of coating agent to the conveyor belt is a further reversal from conventional design practice in the development of cleaning devices, the conventional purpose of which is specifically to remove coating agent from the conveyor belt. However, the development is based on the surprising finding that a substance which has a cleaning effect for the conveyor belt does not have to be used as the first solvent.

On the contrary, the conveyor belt can initially be contaminated with further coating agent in addition to the coating agent residues, as a result of which, however, the coating agent residues located on the conveyor belt can be loosened. The coating agent applied to the conveyor belt can subsequently be reliably removed together with the coating agent residues dissolved therein, for example by means of a doctor blade. It is thereby possible to jointly scrape off and reuse the coating agent applied to the conveyor belt and the loosened coating agent residues without them being mixed with another, in particular second, solvent. This in particular permits reuse of the removed coating agent residues in the coating device. The coating agent used as the first solvent can therefore be in particular varnish, paint or stain if the coating agent residues are likewise composed of varnish or paint or stain.

In an advantageous development, at least one first cleaning element, in particular a cleaning doctor blade, is provided for frictional contact with the lower strand of the conveyor belt and, as seen in the translation direction of the conveyor belt at the lower strand, is arranged downstream of the first roller in order to at least partially scrape off a first solvent placed onto the conveyor belt by means of the first roller and the coating agent residues located on the conveyor belt from the conveyor belt and to guide them in such a manner that they pass onto the cleaning belt.

The advantageous development is not restricted to a configuration of the first cleaning element. The latter is preferably, however, designed as a first cleaning doctor blade which can have at least one cleaning edge, in particular made from plastic, which is provided for the frictional contact with the conveyor belt and is designed to permit gentle removal of the first solvent and coating agent residues from the conveyor belt. A gentle removal results in particular also if the coating agent residues are previously loosened with the first solvent and are present in a homogeneously distributed manner on the conveyor belt. This reduces the increased friction at certain locations between the first cleaning element and the conveyor belt that may be caused by an inhomogeneous distribution of coating agent residues.

The cleaning edge of the first cleaning doctor blade can be oriented here orthogonally in relation to the translation direction of the conveyor belt at the lower strand. Alternatively, the first cleaning doctor blade can also be tilted in relation to the translation direction of the conveyor belt at the lower strand, i.e. not oriented orthogonally or parallel to the translation direction of the conveyor belt at the lower strand.

The first cleaning element is preferably arranged in such a manner that it guides the first solvent and the coating agent residues scraped off from the conveyor belt directly onto the cleaning belt. The first solvent and the coating agent residues dispensed in such a manner are present here along a mixture path on the upper strand of the cleaning belt, said mixture path extending parallel to the main conveying direction of the cleaning belt.

The first cleaning element can also be arranged in such a manner that it is arranged at least in regions between the conveyor belt and the first roller such that the first solvent scraped off from the conveyor belt and the coating agent residues can be guided, in particular as a consequence of gravity, onto the lateral surface of the first roller. During a rotational movement at which the first roller has, on its lateral surface, a superficial tangential speed which is at least partially directed in the same direction as the translation direction of the conveyor belt at the lower strand, the first solvent and coating agent residues can also be put indirectly onto the cleaning belt as a consequence of the rotational movement. In such an embodiment, only a small construction space is required since the first roller and the first cleaning element can be at a small distance from each other. It therefore lies within the scope of an advantageous development that the scraped-off first solvent and the coating agent residues are guided indirectly or directly onto the cleaning belt by means of the cleaning element.

In an arrangement in which the first solvent and coating agent residues are first of all guided onto the first roller and subsequently onto the cleaning belt by means of the first cleaning element, it can be advantageous in particular if the first roller is provided for a rotational movement which is synchronous in relation to the translation direction of the conveyor belt. This is because it is thereby possible to provide the lateral surface of the first roller with a first solvent and coating agent residues, which, as a consequence of the rotational movement of the first roller, can pass into the region in which said roller is in contact with the cleaning belt. As a consequence of the friction-reducing effect of the first solvent and the coating agent, the friction in said contact can be reduced.

In an arrangement in which the first roller is provided for a rotational movement which is opposed to the translation direction of the conveyor belt, the first solvent placed onto the first roller by the first cleaning element and the coating agent residues can likewise be advantageous since, as a consequence of the rotational movement of the first roller, they can be conveyed again into the region in which the first roller is in contact with the conveyor belt. To this extent, the first solvent can be removed from the conveyor belt, placed again onto the roller and can pass from the latter again onto the conveyor belt in order to be removed again. As a result, the outlay for conveying a sufficient quantity of first solvent into the region of contact between the first roller and the conveyor belt is reduced. Furthermore, the first solvent can be prevented from drying out since it can remain in motion and only a slight superficial evaporation takes place.

In an advantageous development, a collecting device is arranged downstream of the first roller and/or the first cleaning element, as seen in the main conveying direction of the cleaning belt, and is designed so as to at least partially collect a quantity of first solvent and coating agent residues transported by the cleaning belt and to guide them into a first tank. It is thereby possible to reuse, to dispose of or to process in some other way the first solvent placed onto the cleaning belt and the coating agent residues as required.

In an advantageous development, the collecting device has at least one removal doctor blade and/or a removal roller which is in frictional contact with the cleaning belt, and preferably at least one guiding element which for example comprises a funnel which is arranged between the removal doctor blade and the first tank in order to guide the first solvent and coating agent residues picked up from the cleaning belt into the first tank.

By means of the removal doctor blade, it is possible in a structurally simple manner to scrape off the first solvent placed onto the cleaning belt and/or coating agent from the cleaning belt. For this purpose, the removal doctor blade can be configured in a manner substantially corresponding to the above-described first cleaning doctor blade and can have an edge via which the removal doctor blade is in frictional contact with the cleaning belt.

Additionally or alternatively, the cleaning belt downstream of the first roller, as seen in the main conveying direction, can be in frictional contact with at least the removal roller which is configured to at least partially scrape off the quantity of first solvent placed onto the cleaning belt and/or coating agent by means of a rotational movement.

In an advantageous development, the first dispensing device is connected to the first tank via a first pumping device and is designed to convey the first solvent and preferably coating agent residues out of the first tank and to place them onto the cleaning belt.

By means of the above-described development, it is possible to provide a circuit in which the first solvent and coating agent residues scraped off from the conveyor belt can circulate and can contribute to cleaning of the conveyor belt. For this purpose, at least the first solvent can be conveyed out of the first tank by means of the first pumping device and placed onto the cleaning belt in the manner already described above via the first dispensing device. The first solvent can be picked up from the cleaning belt and placed onto the conveyor belt by means of the first roller. The first solvent placed onto the conveyor belt together with the coating agent residues located on the conveyor belt can be at least partially scraped off by means of the first cleaning element. The first solvent and the coating agent residues can pass again to the cleaning belt from the first cleaning element and can be guided into the first tank by means of the collecting device. The coating agent residues are preferably dissolved in the first solvent in such a manner that the first solvent is available in the first tank for reuse.

The first tank is preferably a coating agent tank of the coating device; in particular if the first solvent is a coating agent, the coating agent residues of which are intended to be removed from the conveyor belt. Alternatively, the first tank can also be connected to the coating agent tank of the coating device.

In an advantageous development, the cleaning device has at least one second roller which is provided so as, as seen in the translation direction of the conveyor belt at the lower strand, to be arranged below the conveyor belt downstream of the first roller. A lateral surface of the second roller is designed for contact with the lower strand of the conveyor belt. The cleaning belt is arranged below the second roller and is in frictional contact with the lateral surface of the second roller. The second roller is arranged in such a manner that it is tilted with its longitudinal axis in relation to the main conveying direction of the cleaning belt. A second dispensing device is provided on the cleaning belt and/or above the cleaning belt in order to feed a second solvent onto the cleaning belt in such a manner that it is conveyed by means of the conveying movement of the cleaning belt along the main conveying direction into a region in which the cleaning belt is in contact with the second roller. The second roller is designed to at least partially pick up the second solvent located on the cleaning belt by means of a rotational movement and dispense it onto the conveyor belt. The rotational movement of the second roller is oriented in a corresponding or opposed manner with respect to the rotational movement of the first roller.

The above-described development makes it possible to further improve the cleaning effect of the cleaning device. An advantageous which is associated with the use of the second roller and the application of the second solvent consists in that the second solvent can differ from the first solvent in its effect in relation to the coating agent residues to be eliminated. If the first solvent is a coating agent, the second solvent can have in particular an exclusively cleaning effect for the conveyor belt.

In accordance with the statements regarding the first roller, the development of the cleaning device which comprises the second roller is not restricted to the direction of rotation in which the second roller is set into the rotational movement and in particular the orientation which the rotational movement has in relation to the translation direction of the conveyor belt or the main conveying direction of the cleaning belt. The second roller and the first roller are preferably arranged in parallel spaced apart from each other with respect to their longitudinal axes. In particular, the first roller and the second roller can enclose an angle between 0 degrees and 90 degrees with respect to their longitudinal axes.

The second roller can be set into a rotational movement in such a manner that, in the region of the intended contact with the conveyor belt, it has, on its lateral surface, a superficial tangential speed which is at least partially directed in or counter to the translation direction of the translation movement of the conveyor belt. The rotational movement can also be set in such a manner that the superficial tangential speed at the lateral surface of the second roller is partially directed identically or counter to the main conveying direction of the cleaning belt in the region of the frictional contact.

It is likewise within the scope of the advantageous development that the superficial tangential speed of the second roller and the translation speed of the conveyor belt or of the cleaning belt are identical in value or differ from each other. In particular, the superficial tangential speed of the second roller, at least with a speed portion which is oriented corresponding to the translation speed of the conveyor belt or the conveying speed of the cleaning belt, can be in each case greater or smaller than them in value.

In respect of the picking-up of the second solvent by the second roller, the statements regarding the first solvent and the first roller essentially apply correspondingly. It is therefore possible by means of the second roller to pick up the second solvent in a synchronous or opposed movement from the cleaning belt and to dispense it onto the conveyor belt. In the case of a synchronous movement, it is possible in particular for the second solvent, as a consequence of the relative movement between the second roller and the cleaning belt, to be first of all conveyed through the region in which the second roller and the cleaning belt are in frictional contact. The second solvent subsequently passes onto the conveyor belt by means of the rotational movement of the second roller.

In respect of the dispensing of the second solvent from the second roller onto the conveyor belt, the statements regarding the first solvent and the first roller essentially apply correspondingly. It is therefore possible by means of the second roller to dispense the second solvent in a synchronous or opposed movement onto the conveyor belt. In the case of a synchronous movement, it is possible in particular to convey the second solvent, as a consequence of the relative movement between the second roller and the conveyor belt, through the region in which the second roller and the conveyor belt are in frictional contact. As a result, said solvent can be distributed uniformly and preferably over the entire width of the contact region between the second roller and the conveyor belt.

It lies within the scope of the advantageous development that the first solvent and the second solvent are supplied substantially identically, i.e. have the same composition. However, it is advantageous if the second solvent differs from the first solvent. In particular, the second solvent can comprise a cleaning agent. This is conceivable in particular whenever the first solvent is a coating agent. In such a case, the second solvent, in contrast to the first solvent, can have a cleaning effect for the conveyor belt and/or the cleaning belt in order at least in each case to be able to at least loosen the coating agent residues located thereon. There is also a difference between the first solvent and the second solvent whenever a portion of the first solvent is contained in the second solvent, and vice versa.

In an advantageous development, a second cleaning element, in particular a second cleaning doctor blade, is provided for frictional contact with the conveyor belt and, as seen in the translation direction of the conveyor belt at the lower strand, is arranged downstream of the second roller in order to scrape off at least a quantity of the second solvent placed onto the conveyor belt by means of the second roller from the conveyor belt and to guide it in such a manner that it passes onto the cleaning belt.

The second cleaning element is preferably designed in a manner corresponding to the first cleaning element. In addition to the quantity of the second solvent, a quantity of the first solvent located on the conveyor belt and/or coating agent residues not already scraped off by the first cleaning element can also be scraped off. In particular, it is possible by means of the second cleaning element to scrape off a quantity of second solvent from the conveyor belt and to guide it directly onto the cleaning belt or to guide it indirectly firstly onto the second roller from which the second solvent passes onto the cleaning belt. Otherwise, the statements regarding the first cleaning element can apply correspondingly.

In an advantageous development, the collecting device, with respect to the main conveying direction of the cleaning belt, is arranged downstream of the second roller and/or the second cleaning element and is designed to at least partially pick up a quantity of second solvent transported by the cleaning belt from the cleaning belt and to guide it into a second tank.

In a simple configuration, the collecting device has one removal doctor blade or a plurality of removal doctor blades which are each in frictional contact with the cleaning belt. At least one guiding element is preferably provided for each of the removal doctor blades.

A first removal doctor blade can be arranged downstream of the first roller and/or the first cleaning element with respect to the main conveying direction of the cleaning belt in order to scrape off the first solvent placed onto the cleaning belt by the first cleaning element and also coating agent residues and to guide them into the first tank by means of the associated guiding element. In addition or alternatively, the first removal doctor blade can also be arranged downstream of the first roller in order to scrape off a quantity of first solvent not picked up by means of the first roller from the cleaning belt.

A second removal doctor blade can be arranged downstream of the second cleaning element with respect to the main conveying direction of the cleaning belt in order to scrape off the second solvent placed onto the cleaning belt by the second cleaning element and optionally the first solvent and coating agent residues and to guide them into the second tank by means of the associated guiding element. Additionally or alternatively, the second removal doctor blade can also be arranged downstream of the second roller in order to scrape off a quantity of second solvent not picked up by means of the second roller from the cleaning belt.

Additionally or alternatively, in addition to the removal roller already described above, the collecting device can also have a further removal roller which is in each case in frictional contact with the cleaning belt.

The second tank is preferably fluidically separated from the first tank.

In an advantageous development, the second dispensing device is connected to the second tank via a second pumping device in order to convey at least the second solvent out of the second tank and to place it onto the cleaning belt.

By means of the above-described development, it is possible, in addition to the circuit already described above, to provide a second circuit in which the second solvent is placed onto the cleaning belt so that it can be picked up from the cleaning belt by means of the second roller and can be placed onto the conveyor belt. By means of the second cleaning element, the second solvent together with the first solvent and coating agent residues which have not been picked up by the first cleaning element can be scraped off from the conveyor belt and guided onto the cleaning belt in such a manner that they can be conducted into the second tank and placed again out of the second tank onto the cleaning belt.

The second solvent located in the second tank can be mixed with the first solvent and scraped-off coating agent residues. Nevertheless, the contents of the second tank can be used in order to be able to be put onto the cleaning belt and to obtain a cleaning effect. A ratio of the second solvent located in the second tank to the first solvent and/or to the coating agent residues can be monitored by means of a saturation sensor which is arranged in the second tank.

The first circuit and the second circuit are preferably separated from each other in such a manner that the second solvent conducted in the second circuit does not pass into the first circuit and mix there with the first solvent. If the first solvent is a coating agent and the second solvent is a cleaning agent, it can be ensured by separating the first and the second circuit that the coating agent is not mixed with the cleaning agent and can therefore be continuously readily reusable.

In an advantageous development, the cleaning device has a drying roller which is provided so as to be arranged, in the translation direction of the conveyor belt at the lower strand, below the lower strand of the conveyor belt downstream of the first roller or the second roller. A lateral surface of the drying roller is designed for contact with the lower strand of the conveyor belt. The cleaning belt is arranged below the drying roller. The lateral surface of the drying roller is in contact with the upper strand of the cleaning belt. The drying roller is configured to pick up at least the second solvent located on the conveyor belt by means of a rotational movement and to dispense it onto the cleaning belt.

According to the above-described development, the drying roller can primarily be designed to remove the second solvent which is placed onto the conveyor belt and may be composed of cleaning agent. In this case, it is advantageous for the conveyor belt to be provided only temporarily with cleaning agent throughout its entire cleaning operation. As a result, in order to loosen the first solvent and the coating agent residues located on the conveyor belt, use can be made of a greatly loosening cleaning agent which in principle may have a damaging effect on the conveyor belt. However, owing to the short period in which the cleaning agent stays on the conveyor belt, it can be ensured in a simple manner that the conveyor belt is not damaged. The drying roller is preferably arranged at a distance from and parallel to the first or the second roller.

According to the statements regarding the first roller and the second roller, the development of the cleaning device which comprises the drying roller is not restricted to the direction of rotation in which the drying roller is set into the rotational movement and in particular the orientation which the rotational movement has in relation to the translation direction of the conveyor belt or the main conveying direction of the cleaning belt. The drying roller and the first and/or the second roller are preferably arranged spaced apart parallel to one another with respect to their longitudinal axes. In particular, the drying roller and the first and/or the second roller can enclose an angle between 0 degrees and 90 degrees with respect to their longitudinal axes.

The drying roller can be set into a rotational movement in such a manner that, in the region of the provided contact with the conveyor belt, it has, on its lateral surface, a superficial tangential speed which is at least partially directed in or counter to the translation direction of the translation movement of the conveyor belt. The rotational movement can likewise be set in such a manner that the superficial tangential speed at the lateral surface of the drying roller is directed in a partially identical or opposed manner in relation to the main conveying direction of the cleaning belt in the region of the frictional contact.

It likewise lies within the scope of the advantageous development that the superficial tangential speed of the drying roller and the translation speed of the conveyor belt or of the cleaning belt are identical in value or differ from one another. In particular, the superficial tangential speed of the drying roller can in each case be greater or smaller than the translation speed of the conveyor belt or of the conveying speed of the cleaning belt.

In order to further improve the drying effect, it is advantageous for a drying doctor blade to be provided in order to be brought into frictional contact with the conveyor belt at a distance from the drying roller and to dry the conveyor belt. In principle, although the use of drying doctor blades is associated with an increased mechanical loading of the conveyor belt, this depends primarily on the prevailing contact pressure. If, however, the drying doctor blade is provided in addition to the drying roller, which likewise has a drying effect, the quantity to be removed of coating agent and/or solvent on the conveyor belt is small. For this reason, only a low contact pressure is required between the drying doctor blade and the conveyor belt in order to obtain the desired drying effect. Noticeable damage to the conveyor belt does not occur here.

Alternatively, the cleaning device can have the drying doctor blade instead of the drying roller, which is provided so as, in the translation direction of the conveyor belt at the lower strand, to be arranged below the lower strand of the conveyor belt downstream of the first roller or the second roller. An edge of the drying doctor blade is preferably designed for frictional contact with the lower strand of the conveyor belt. The cleaning belt is arranged below the drying doctor blade. The drying doctor blade is configured to pick up at least the second solvent located on the conveyor belt and to dispense it onto the cleaning belt.

In an advantageous development, at least one guiding doctor blade is arranged at least downstream of one of the rollers, in particular in each case downstream of the first or the second roller, with respect to the main conveying direction of the cleaning belt, and is configured to guide the quantity of solvent placed onto the cleaning belt, in particular first and second solvent, and coating agent residues transversely with respect to the main conveying direction of the cleaning belt in order to establish a path on the cleaning belt.

The guiding doctor blade can be configured as a thin-walled component, in particular made from an antistatic plastic, and can have a flat structural form. The guiding doctor blade is preferably arranged on an end region of at least one of the rollers, in particular the first or the second roller, and oriented with a plane of extent orthogonally to the cleaning belt. The guiding doctor blade encloses an acute or obtuse angle with its plane of extent and the main conveying direction of the cleaning belt.

In an advantageous development, the cleaning device comprises at least one contact pressure element which is configured to bring about pressing between the lateral surface of one of the rollers, in particular the first roller and/or the second roller and/or the drying roller, and the conveyor belt. Additionally or alternatively, the contact pressure element can be configured to bring about a contact pressure between one of the cleaning elements or doctor blades, in particular the first and/or the second cleaning doctor blade and/or the drying doctor blade, and the conveyor belt.

Additionally or alternatively, a contact pressure element can be provided in order to bring about pressing between the lateral surface of one of the rollers, in particular the first roller and/or the second roller and/or the drying roller, and the cleaning belt.

In an advantageous development, the contact pressure element can comprise at least one contact pressure rod and/or a rotatably mounted contact pressure roller which is arranged, preferably offset in parallel to one of the rollers, in particular the first or the second roller and/or to the drying roller, in order to bring about the pressing in such a manner that one of the rollers and/or the drying roller is partially looped around by the conveyor belt and/or by the cleaning belt.

In an advantageous development, at least the first roller and the cleaning belt are arranged on a movable lifting device. This makes it possible to be able to flexibly position the cleaning device and to adjust it in height via a pneumatic, magnetic, hydraulic, electric or mechanical actuator. In particular, it is thereby possible to set the contact pressure between the first roller and the conveyor belt or the cleaning belt to meet requirements, and preferably independently of one another. The looping-around of the first roller with the conveyor belt and/or the cleaning belt can preferably likewise be set. It lies within the scope of the advantageous development that the second roller and the drying roller are likewise adjustable by means of the lifting device in order to achieve the contact pressure thereof and/or looping-around with the conveyor belt and/or the cleaning belt.

Preferably, the first roller and/or the second roller and/or the drying roller is movable in relation to the cleaning belt by means of an adjustment mechanism, in particular a lever device, in particular independently of one another. It is thereby possible to remove and to clean the cleaning belt and the roller, in particular the first and the second roller, and also the drying roller independently from the cleaning belt. Adjustment screws are preferably provided in order to set a distance between one of the rollers and the conveyor belt or between one of the rollers and the cleaning belt.

As mentioned above, the object is also achieved by means of a coating device having a conveyor belt for receiving a workpiece and having at least one coating unit for superficially applying a coating agent to the workpiece. The coating device comprises a cleaning device having at least one first roller which is arranged below the conveyor belt and the lateral surface of the first roller is in contact with a lower strand of the conveyor belt. The cleaning device also comprises an endlessly revolving cleaning belt which is arranged below the first roller.

It is essential that the lateral surface of the first roller is in contact with an upper strand of the cleaning belt, and that the cleaning belt is tilted with a main conveying direction on the upper strand in relation to a longitudinal axis of the first roller. Furthermore, it is essential that at least one first dispensing device is provided on the cleaning belt and/or above the cleaning belt in order to feed a first solvent onto the cleaning belt. The first dispensing device and the cleaning belt are arranged with respect to each other here in such a manner that the first solvent placed onto the cleaning belt is conveyed by means of a conveying movement of the cleaning belt along the main conveying direction into a region in which the cleaning belt is in contact with the first roller, and wherein the first roller is designed and arranged in such a manner that, by means of a rotational movement, it at least partially picks up the first solvent located on the cleaning belt and dispenses it onto the conveyor belt.

Preferably, the cleaning device used for the coating device is the cleaning device according to the invention or an advantageous development thereof. Therefore, the statements in respect of the advantages and effects which can be achieved with the cleaning device according to the invention or an advantageous development thereof apply correspondingly in respect of the coating device according to the invention.

As likewise mentioned above, the object is also achieved by means of a method for cleaning an endlessly revolving conveyor belt contaminated with coating agent residues, in which at least one first roller is arranged below the conveyor belt in such a manner that it is in contact by means of its lateral surface with a lower strand of the conveyor belt. An endlessly revolving cleaning belt is furthermore arranged below the first roller.

It is essential that the cleaning belt is arranged below the first roller in such a manner that the lateral surface of the first roller is in contact with an upper strand of the cleaning belt, wherein the cleaning belt is tilted with a main conveying direction in relation to a longitudinal axis of the first roller, and that a first solvent is placed onto the upper strand of the cleaning belt and is conveyed by means of a conveying movement of the cleaning belt along the main conveying direction into a region in which the cleaning belt is in contact with the first roller, and wherein the first roller is set into a rotational movement in order to pick up the first solvent located on the cleaning belt and to dispense it onto the conveyor belt.

The method according to the invention can preferably be carried out by means of a cleaning device according to the invention or an advantageous development thereof. The statements regarding the advantages and effects which can be achieved with the cleaning device according to the invention or an advantageous development thereof therefore apply correspondingly.

BRIEF DESCRIPTION OF THE DRAWINGS

Further preferred features and embodiments of the cleaning device according to the invention will be explained below with reference to two exemplary embodiments and five figures. The exemplary embodiments are merely advantageous configurations of the invention and therefore do not restrict the latter.

DETAILED DESCRIPTION

Figure 1:
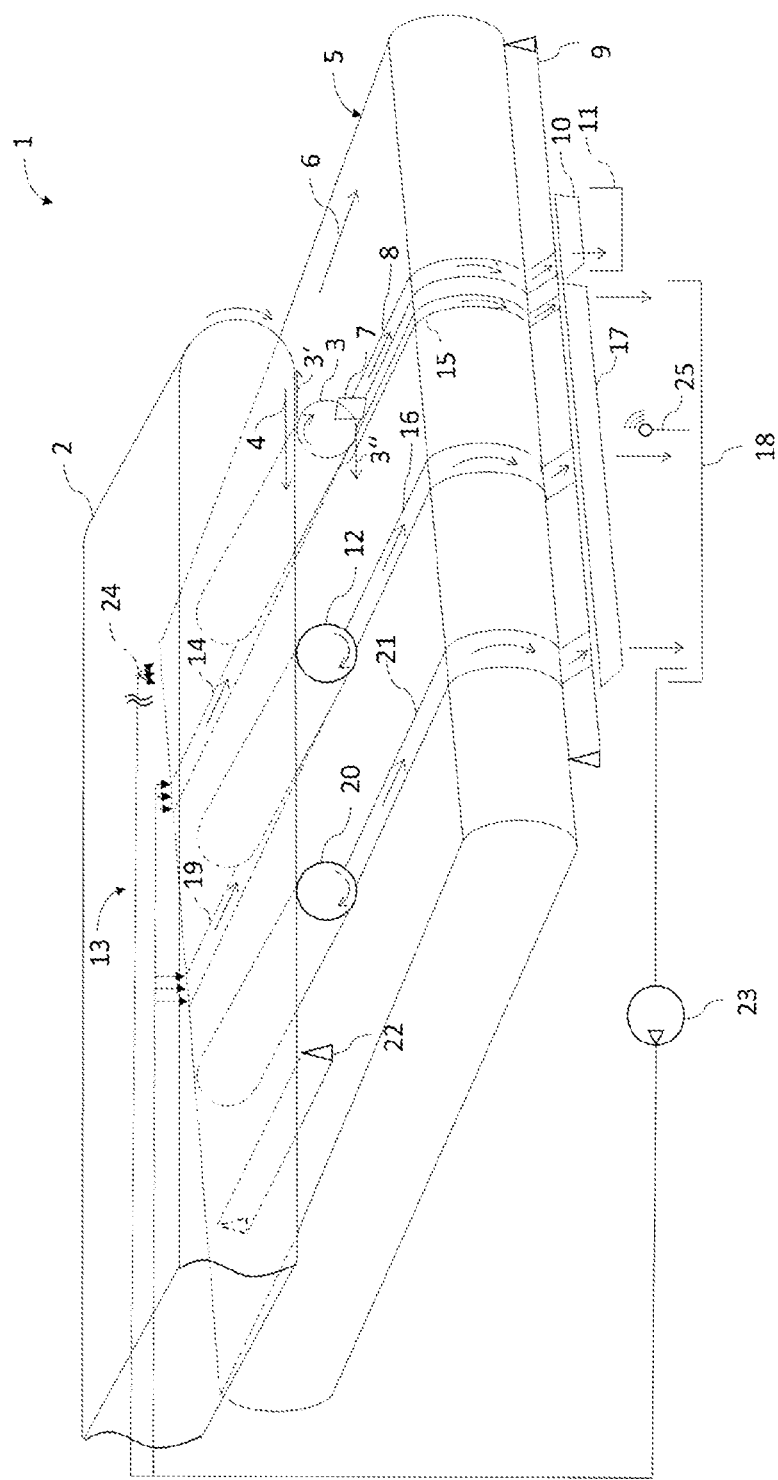
FIG. 1 shows a first exemplary embodiment of a cleaning device configured according to the invention for a conveyor belt contaminated with coating agent, in a schematic oblique view.

FIG. 1 shows a cleaning device 1 for a conveyor belt 2 contaminated with coating agent.

The conveyor belt 2 is part of a coating device (not shown) and serves to receive a workpiece (not shown) and to convey it through the coating device. Said workpiece is provided in the process with coating agent, with it not being possible to prevent the conveyor belt 2 from being contaminated with coating agent residues. In order to remove the coating agent residues from the conveyor belt 2, use is made of the cleaning device 1.

The cleaning device 1 comprises a first roller 3 which is arranged below the conveyor belt 2 and is in frictional contact with the lower strand thereof. A roller drive (not shown) serves to set the first roller 3 into a rotational movement while the conveyor belt is in a translation movement in the translation direction 4. By this means, a relative movement arises in the frictional contact between the conveyor belt 2 and the first roller 3, during which the coating agent residues located on the conveyor belt 2 are at least partially scraped off by means of the first roller 3. In the frictional contact between the first roller 3 and the conveyor belt 2, the first roller 3 has a tangential speed 3' directed in parallel and opposed to the translation direction 4. Alternatively, the first roller 3 can be arranged relative to the conveyor belt 2 in such a manner that the tangential speed 3' and the conveyor belt speed in the translation direction 4 are not directed parallel to each other.

As a consequence of the rotational movement of the first roller 3, the coating agent residues scraped off from the conveyor belt 2 pass onto a cleaning belt 5 which is arranged on a side of the first roller 3 facing away from the conveyor belt 2 and is likewise in frictional contact with said roller. The cleaning belt 5 is set by means of a belt drive (not shown) into a conveying movement with a superficial cleaning belt speed which is oriented corresponding to a main conveying direction of the cleaning belt. By this means, a relative movement arises in the frictional contact between the first roller 3 and the cleaning belt 5, by means of which relative movement the coating agent residues located on the first roller 3 are at least partially picked up and conveyed further by the cleaning belt 5.

The first roller 3 is arranged in relation to the conveyor belt 2 in such a manner that the longitudinal axis of the first roller 3 and the direction of the conveyor belt speed in the translation direction 4 are directed orthogonally to each other. However, in relation to the cleaning belt 5, the first roller 3 is arranged in such a manner that its longitudinal axis and the direction of the cleaning belt speed in the main conveying direction 6 are tilted in value by approximately 5 degrees and enclose an acute angle.

In the frictional contact between the first roller 3 and the cleaning belt 5, the first roller 3 has a tangential speed 3″ which encloses an obtuse angle with the cleaning belt speed along the main conveying direction 6 and is directed partially opposed thereto. By this means, it is possible to convey the coating agent residues placed onto the cleaning belt 5 out of the common contact region between the first roller 3 and the cleaning belt 5 and therefore to counteract the accumulation of coating agent residues.

A guiding doctor blade 7 is arranged downstream of the first roller 3 along the main conveying direction 6 with respect to the cleaning belt speed and serves to establish a coating agent path 8 for the coating agent residues placed onto the cleaning belt 5. For this purpose, the guiding doctor blade 7 is arranged at an acute angle in relation to the main conveying direction 6. Alternatively, the guiding doctor blade can also serve to direct a solvent stream, which flows past the roller 3, transversely with respect to the main conveying direction 6 and to establish a solvent path 15. The coating agent path 8 is guided into a first tank 11 by means of a removal doctor blade 9 and a funnel 10.

In the exemplary embodiment which is shown, the first roller 3 does not scrape off the entire quantity of coating agent residues from the conveyor belt 2. Rather, there is still a quantity of coating agent residues on the conveyor belt 2 downstream of the contact between the first roller 3 and the conveyor belt 2 with respect to the translation movement of the conveyor belt. So that this quantity of coating agent residues can be effectively removed from the conveyor belt 2, it is loosened by means of solvent and subsequently virtually completely removed by means of a second roller 12. The solvent can be the first or the second solvent within the meaning of the invention.

In order to apply the solvent, the cleaning device 1 has a dispensing device 13. Said dispensing device 13 is partially arranged upstream of the first roller 3 with respect to the main conveying direction 6 of the cleaning belt 5 and serves to place solvent onto the cleaning belt 5. In the exemplary embodiment shown here, the solvent can be cleaning agent which has a cleaning effect for the conveyor belt. By means of the removal movement of the cleaning belt 5, the solvent passes along a cleaning agent path 14 into a region in which the first roller 3 is in frictional contact with the cleaning belt 5. The first roller 3 picks up the cleaning agent from the cleaning belt 5 there and conveys it by means of its rotational movement into the region in which it is in frictional contact with the conveyor belt 2. By means of the relative movement between the first roller 3 and the conveyor belt 2, the cleaning agent located on the first roller 3 passes onto the conveyor belt 2. As a result, the quantity of coating agent residues located there can be loosened and diluted.

The solvent in the solvent path 14 is present in a quantity which cannot be completely picked up by the first roller 3. For this reason, some of the solvent from the solvent path 14 remains on the cleaning belt and, as a consequence of the translation movement of the cleaning belt 5, is conveyed to an end region of the first roller 3. At this region, the solvent, as a consequence of the tilting of the first roller 3 in relation to the cleaning belt speed 6, can accumulate and flow past the first roller 3 in a further solvent path 15. The cleaning agent present in the solvent path 15 can likewise be scraped off from the cleaning belt 5 by means of the removal doctor blade 9 and conducted into a second tank 18 which is described in detail further below.

The second roller 12 is arranged offset parallel to the first roller 3 and serves to at least partially scrape off the coating agent residues located on the conveyor belt 2 and not picked up by the first roller, and also the quantity of solvent placed on the conveyor belt 2. For this purpose, the second roller 12 is in each case in frictional contact with the conveyor belt 2 and with the cleaning belt 5.

The roller drive (not shown) serves to set the second roller 12 into a rotational movement corresponding to the first roller 3. By this means, analogously to the statements regarding the first roller 3, relative movements arise, by means of which the residual quantity of coating agent residues and solvent located on the conveyor belt 2 first of all passes onto the second roller 12 and subsequently onto the cleaning belt 5. The cleaning belt 5 conveys the mixture of coating agent residues and solvents along a mixture path 16 to the removal doctor blade 9. Said mixture is conveyed into the second tank 18 by means of a second funnel 17.

The dispensing device 13 is arranged upstream of the second roller 12 in such a manner that solvent can be placed onto the cleaning belt 5 and can pass by means of its translation movement along a solvent path 19 to the second roller 12. By means of the rotational movement of the second roller 12, the solvent located on the second roller 12 passes onto the conveyor belt 2. By this means, a residual quantity of coating agent not picked up by the first and second roller can be additionally loosened and diluted. At the same time, the frictional contact between the second roller 12 and the conveyor belt 2 is lubricated.

The cleaning device 1 comprises a drying roller 20 which is arranged offset in parallel to the first roller 3 and the second roller 12 and serves to at least partially pick up a quantity of coating agent residues and solvent which may still be located on the conveyor belt 2.

The roller drive (not shown) serves to set the drying roller 20 into a rotational movement corresponding to the first roller 3 and the second roller 11. By means of the relative movement between the drying roller 20 and the conveyor belt 2, the quantity of coating agent residues and solvent which may still be located on the conveyor belt 2 passes onto the drying roller 20 and subsequently onto the cleaning belt 5. The cleaning belt 5 conveys the mixture of coating agent residues and solvent along a mixture path 21 to the doctor blade 9. The mixture consisting of coating agent and cleaning agent present along the mixture path 21 is guided into the second tank 18 by means of the second funnel 17.

A drying doctor blade 22 is arranged downstream of the drying roller 20 with respect to the translation movement of the conveyor belt 2 and is in mechanical contact with the conveyor belt 2. The medium scraped off by means of the drying doctor blade 22 can pass from the drying doctor blade 22 onto the cleaning belt 5 and, as a consequence of the cleaning belt movement, there can be a path (not shown) corresponding to the paths 8, 15, 16 and 21, which path can be guided by means of the removal doctor blade 9 and the funnel 17 into the second tank 18.

The mixture of solvent and coating agent residues located in the second tank 18 is in a ratio in which the portion of solvent significantly exceeds the portion of coating agent residues. The solvent located in the cleaning tank 18 can therefore be conveyed by means of a pump 23 to the dispensing device 13 and placed onto the cleaning belt 5 for cleaning and lubricating purposes. A saturation sensor 25 serves to measure the saturation of the solvent with the coating agent in the second tank 18 and to output a signal if the saturation exceeds a previously set limit value.

The dispensing device 13 furthermore comprises a spray nozzle 24 by means of which the cleaning agent from the cleaning tank 18 can be placed onto an edge region of the cleaning belt 5 and conveyed directly to the removal doctor blade 9. By this means, the mechanical contact between the cleaning belt 5 and the removal doctor blade 9 can be lubricated in order to increase the service life of the cleaning belt 5.

Figure 2B:
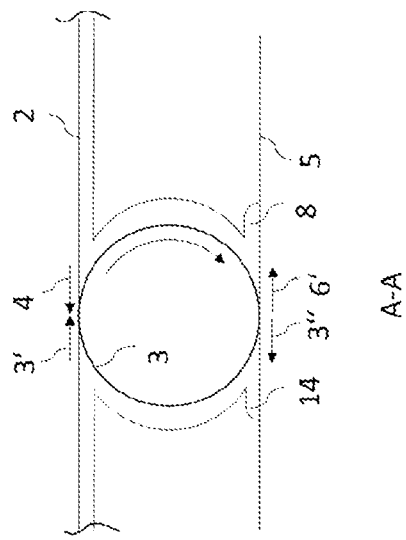
FIGS. 2A and 2B show the exemplary embodiment according to FIG. 1 in a top view in FIG. 2A and a lateral sectional view in FIG. 2B of a roller during operation of the cleaning device.
Figure 2A:
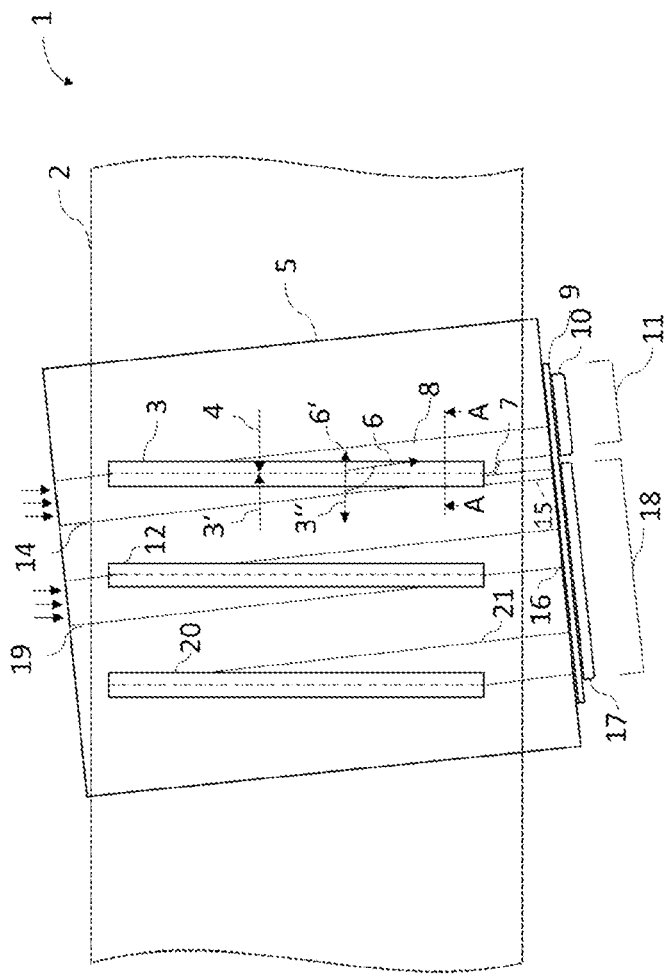

FIG. 2A is intended to serve for better understanding of the relative arrangements between the conveyor belt 2 and the components of the cleaning device 1 that are shown in FIG. 1. For better clarity, the cleaning device 1 is reduced to some of the components shown in FIG. 1, with the same reference signs being used for the remaining components.

As already explained with regard to FIG. 1, the conveyor belt 2 shown in FIG. 2A in the contact region with the first roller 3 is in a translation movement with a superficial conveyor belt speed in the translation direction 4. The first roller 3, the second roller 12 and the drying roller 20 are oriented with their respective longitudinal axes substantially orthogonally to the conveyor belt speed in the translation direction 4.

At the contact between the conveyor belt 2 and the first roller 3, the conveyor belt speed in the translation direction 4 and the tangential speed 3' of the first roller 3 run in parallel and are directed in an opposed manner with respect to each other. The tangential speeds (not shown) of the second roller 12 and the drying roller 20 are likewise directed in parallel and opposed to the conveyor belt speed in the translation direction 4.

As likewise already explained with regard to FIG. 1, the cleaning belt 5 is likewise in a translation movement in the contact region with the first roller 3 and has a superficial cleaning belt speed in the main conveying direction 6.

At the contact between the cleaning belt 5 and the first roller 3, the cleaning belt speed has a speed portion 6' in the main conveying direction 6. Furthermore, the first roller 3 has a tangential speed 3" in contact with the cleaning belt 5. At the contact between the cleaning belt 5 and the first roller 3, the speed portion 6' and the tangential speed 3" run in parallel and are directed in an opposed manner with respect to each other. The tangential speeds (not shown) of the second roller 12 and of the drying roller 20, in their respective contacts with the cleaning belt, are likewise directed in parallel and opposed to the speed portion 6'.

The sectional illustration A-A in FIG. 2B clarifies the above-described orientations of the tangential speed 3' in relation to the conveyor belt speed in the translation direction 4 at the contact between the first roller 3 and the conveyor belt 2. The sectional illustration A-A likewise shows the orientations of the tangential speed 3" in relation to the speed portion 6' of the cleaning belt speed 6 at the contact between the first roller 3 and the cleaning belt 5.

In order to improve the cleaning effect of the first or the second roller 3 or 12 or, for instance, the drying effect of the drying roller 20 and the drying doctor blade 22, it is advantageous to increase a looping-around of said rollers, or a contact pressure between said rollers, in relation to the conveyor belt 2 and the cleaning belt. For this purpose, additional contact pressure elements can be provided for the cleaning device 2 according to FIGS. 1, 2A and 2B, said contact pressure elements being shown by way of example on the first roller 3 in two different embodiments in FIGS. 3A and 3B.

Figure 3B:
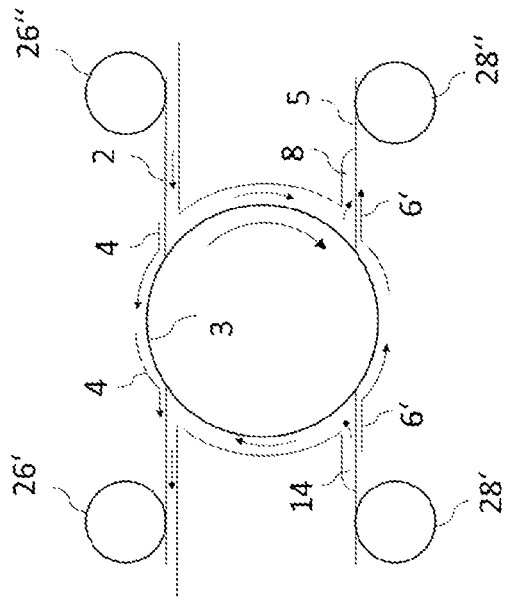
FIGS. 3A and 3B shows two possible configurations for a contact pressure device for the roller in the lateral sectional views.
Figure 3A:
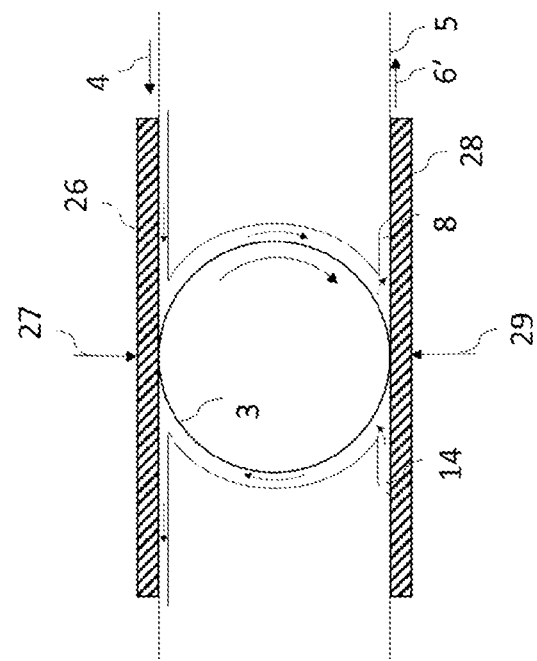

FIG. 3A shows the first roller 3 which is in frictional contact with the conveyor belt 2 and the cleaning belt 5 in a manner which has already been explained. A first contact pressure element 26 in the form of a contact pressure table is arranged on a side of the conveyor belt 2 that faces away from the first roller 3. The first contact pressure element 26 serves to exert an adjustable contact pressure force 27 against the conveyor belt 2 and to press the latter against the first roller 3.

A second contact pressure element 28 which is likewise in the form of a contact pressure table is arranged on a side of the cleaning belt 5 that faces away from the first roller 3. The second contact pressure element 28 serves to exert an adjustable contact pressure force 29 against the cleaning belt 5 and to press the latter against the first roller 3.

FIG. 3B shows an alternative arrangement of contact pressure elements 26', 26" and 28' and 28", of which the contact pressure elements 26', 26" are designed as rotatably mounted contact pressure rollers which extend with their longitudinal axes substantially parallel to the first roller 3. The contact pressure elements 26' and 26" are arranged on a side of the conveyor belt 2 that faces away from the first roller 3 and are offset in relation to the first roller 3 in such a manner that the conveyor belt 2 is tensioned around the first roller 3 and partially loops around the latter. The contact pressure elements 28' and 28" are designed as contact pressure rods, not mounted rotatably, and are arranged on the side of the cleaning belt 5 in accordance with the arrangement of the contact pressure elements 26', 26" and cause looping-around and tensioning of the first roller 3 with the cleaning belt 5.

Figure 4:
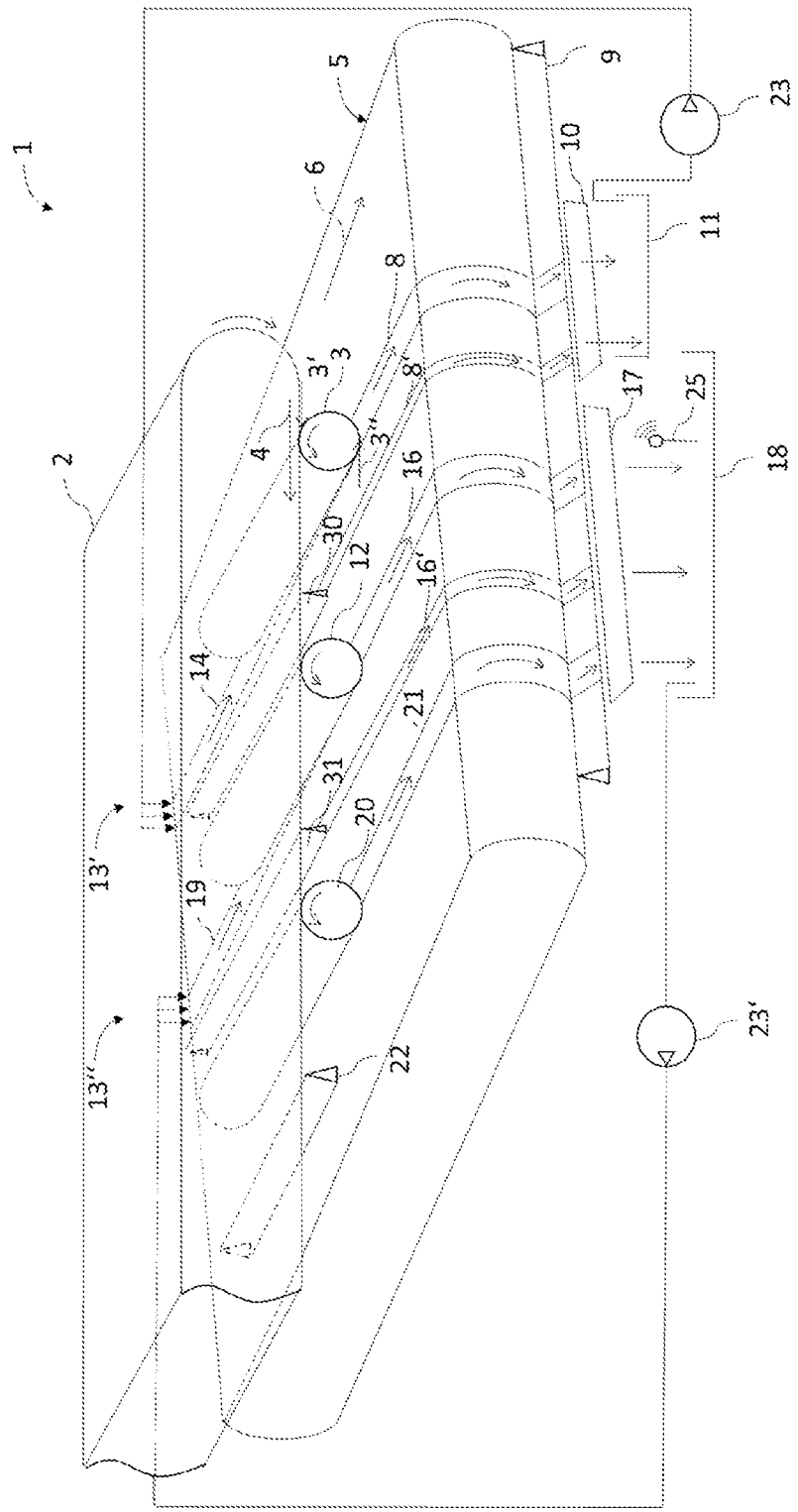
FIG. 4 shows a second exemplary embodiment of a cleaning device configured according to the invention for a conveyor belt contaminated with coating agent, in a schematic oblique view.

FIG. 4 shows an alternative embodiment of the cleaning device 1 which partially has the same features as the cleaning device 1 shown in FIGS. 1, 2A and 2B. For simpler understanding of FIG. 4, correspondingly identical reference signs as in FIGS. 1, 2A and 2B are used for said same features.

In the case of the cleaning device 1 shown in FIG. 4, a first roller 3, a second roller 12 and a drying roller 20 are arranged below a conveyor belt 2 and are in contact therewith in the region of the lower strand of the conveyor belt 2. A cleaning belt 5 which is likewise in frictional contact with the first roller 3, the second roller 12 and the drying roller 20 is located on a side facing away from the conveyor belt 2.

The cleaning belt 5, during its conveying movement at the upper strand, has a main conveying direction 6 which is tilted in each case by a value of approx. 5 degrees in relation to the longitudinal axes of the first roller 3, the second roller 12 and the drying roller 20.

A first dispensing device 13' is arranged to place a first solvent onto the cleaning belt 5 in such a manner that said solvent is conveyed by means of a conveying movement of the cleaning belt 5 along the main conveying direction 6 into a region in which the cleaning belt 5 is in contact with the first roller 3.

The first roller 3 serves to pick up the first solvent placed onto the cleaning belt 5 and to dispense it onto the conveyor belt 2 in order to loosen the coating agent residues located thereon. During the supply of the first solvent to the first roller 3, said solvent is present along a solvent path 14 corresponding to the statements regarding FIG. 1.

In contrast to the cleaning device shown in FIGS. 1, 2A and 2B, the tangential speed 3″ of the first roller 3 is partially oriented in the region of contact with the cleaning belt 5 in accordance with its main conveying direction 6. The relative movement thereby set between the first roller 3 and the cleaning belt 5 causes the first solvent to first of all be conveyed between the first roller 3 and the cleaning belt 5. This means that the common contact between the first roller 3 and the cleaning belt 5 is not formed in a sealing manner, i.e. is permeable to substances. This can be achieved depending on a contact pressure force which can be set between the first roller 3 and the cleaning belt 5, for example by means of one of the contact pressure elements 29, 28′, 28″ according to FIGS. 3A and 3B.

The first solvent is subsequently conveyed to the conveyor belt 2 by means of the rotational movement of the first roller 3. In contrast to the cleaning device 1 shown in FIGS. 1 and 2, the rotational movement of the first roller 3 is oriented in such a manner that the first roller 3 in the region of contact with the conveyor belt 2 has a tangential speed 3′ which is directed in the same direction as the translation movement of the conveyor belt 2. As a result, the solvent is therefore placed onto the conveyor belt 2 in synchronism with the translation movement 4 and conveyed between the first roller 3 and the conveyor belt 2. The contact between the first roller 3 and the conveyor belt 2 is therefore not configured in a sealing manner either. As a consequence of such an application of solvent, the first solvent is distributed uniformly over the entire width of the conveyor belt 2. As a result, the coating agent residues located on the conveyor belt 2 can be loosened and, as is also explained in detail, removed from the conveyor belt 2. In addition, the friction between the first roller 3 and the conveyor belt 2 is reduced, as a result of which their respective service lives are prolonged.

In the exemplary embodiment shown in FIG. 4, the first solvent is coating agent, the coating agent residues of which are intended to be eliminated from the conveyor belt 2. In another conceivable embodiment, as first solvent, varnish, paint or stain can therefore be used as first solvent. The use of coating agents as first solvent is associated with the advantage that they have a releasing effect on the coating agent residues located on the conveyor belt 2. As a result, coating agent residues can therefore be loosened by the application of the coating agent and removed with other means which are also explained in detail below. The first roller 3 is therefore an application roller which has substantially no cleaning effect on the conveyor belt.

A quantity of first solvent not picked up by the first roller 3 is conveyed away as a consequence of the conveying movement of the cleaning belt 5 along the main conveying direction 6 and guided into a first tank 11 by means of the removal doctor blade 9 and the funnel 10. The first solvent here is present in a solvent path 8 which extends substantially along the main conveying direction 6.

A first cleaning doctor blade 30 is provided for frictional contact with the lower strand of the conveyor belt 2 and is arranged spaced apart from the first roller 3 in such a manner that the first solvent placed onto the conveyor belt by means of the first roller 3 and the coating agent residues located on the conveyor belt 2 are at least partially scraped off from the conveyor belt 2 and placed onto the cleaning belt 5. The quantity of first solvent placed onto the cleaning belt 5 in such a manner and the scraped-off coating agent residues are present in a path 8′ which is guided into the first tank 11 by means of the removal doctor blade 9 and the funnel 10.

A first pumping device 23 is connected to the tank 11 and conveys the first solvent to a first dispensing device 13′ by means of which the first solvent is placed together with the coating agent residues in the solvent path 14 onto the cleaning belt 5. As a result, they pass, in the manner already described above, into the region in which the first roller 3 is in contact with the cleaning belt 5 in order to be placed onto the conveyor belt 2 via the rotational movement of the first roller 3.

A second roller 12 is arranged spaced apart parallel to the first roller 3 and is likewise set into a rotational movement which is oriented corresponding to the rotational movement of the first roller 3.

A second dispensing device 13″ is provided in order to place a second solvent onto the cleaning belt 5. The second solvent comprises a cleaning agent and is present along a solvent path 19 corresponding to the main conveying direction 6 of the cleaning belt 5. The second solvent is conveyed by means of the conveying movement of the cleaning belt 5 into the region in which the second roller 12 is in frictional contact with the cleaning belt 5. As a consequence of a relative movement between the cleaning belt 5 and the second roller 12, the second solvent, in a manner substantially corresponding to the statements regarding the first solvent, is first of all conveyed between the second roller 12 and the cleaning belt 5 and subsequently placed onto the conveyor belt 2 as a consequence of the rotational movement of the second roller 12.

A quantity of second solvent not picked up by the second roller 12 is conveyed away as a consequence of the conveying movement of the cleaning belt 5 along the main conveying direction 6 and guided into a second tank 18 by means of the removal doctor blade 9 and the funnel 17. The second solvent is present here in a path 16 which extends substantially along the main conveying direction 6.

Since the rotational movement of the second roller 12 does not differ from the first roller 3, the second solvent is placed in a synchronous movement between the second roller 12 and the conveyor belt 2 onto the conveyor belt 2 and uniformly distributed thereon. As a result, the first solvent which is located on the conveyor belt and is not picked up by means of the first cleaning doctor blade 30 and also coating agent residues can be uniformly loosened.

A second cleaning doctor blade 31 is arranged downstream of the second roller 12 with respect to the translation direction of the conveyor belt 2 and serves to scrape off the loosened first solvent located on the conveyor belt 2 and coating agent residues and also the second solvent and to place them onto the cleaning belt 5. The second solvent placed onto the cleaning belt 5 by means of the second cleaning doctor blade 31 is therefore present together with the remaining first solvent likewise scraped off and coating agent residues along a path 16′ which extends parallel to the path 16 and is likewise guided into the second tank 18 by means of the removal doctor blade 9 and the funnel 17.

A drying roller 20 is arranged spaced apart in parallel to the first and the second roller 3 and 12 and is in contact at its lateral surface with the conveyor belt. The cleaning belt 5 is arranged below the drying roller 20. On a side facing away from the conveyor belt 2, the drying roller 20 is in frictional contact by way of its lateral surface with the cleaning belt 5. By means of a rotational movement of the drying roller 20, at least the solvent located on the conveyor belt 2 and coating agent residues which are still present are picked up and dispensed onto the cleaning belt 5.

The rotational movement of the drying roller 20 corresponds to the rotational movements of the respective first roller 3 and of the second roller 12. Contrary to the statements regarding the first roller 3 and the second roller 12, there is no separate application of solvent to the drying roller 20. The latter serves solely for drying the conveyor belt 2, wherein a quantity of solvent which is picked up and which can comprise the first and the second solvent, and possible coating agent residues are placed onto the cleaning belt 5, guided along a path 21 to the removal doctor blade 9 and conducted into the second tank 18. As already described with respect to FIGS. 1 to 3, a second drying doctor blade 22 is used for additionally drying the conveyor belt 2.

A second pumping device 23' serves to convey the solvent which is contained in the tank 18 and which can contain the first solvent and the second solvent, and also coating agent residues to the second dispensing device 13". A circuit can thereby be produced in which a mixture of first solvent and second solvent and also coating agent residues can be placed for cleaning purposes onto the cleaning belt 5 and can pass again into the tank 18 via the above-described arrangement of second roller 12, second cleaning doctor blade 31 and the drying roller 20.

In contrast to FIGS. 1, 2A and 2B, in the case of the cleaning device 1 shown in FIG. 4, the conveyor belt 2 is not cleaned by means of the first roller 3 and the second roller 12, but rather by means of the first cleaning doctor blade 30 and the second cleaning doctor blade 31. The first roller 3 and the second roller 12 serve, on the contrary, primarily to provide the conveyor belt 2 homogeneously with solvent in order to create good conditions for doctor blading of the conveyor belt 2.

Figure 5B:
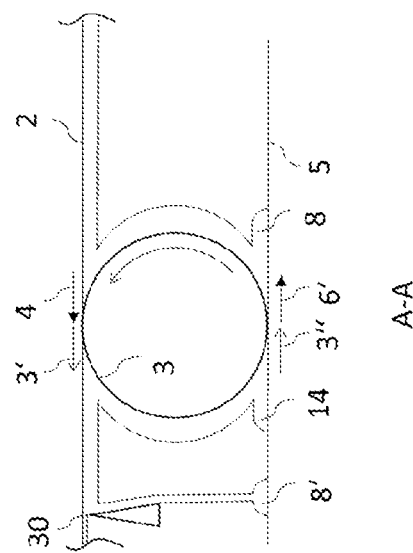
FIGS. 5A and 5B show the exemplary embodiment according to FIG. 4 in a top view in FIG. 5A and a lateral sectional view in FIG. 5B of a roller during operation of the corresponding cleaning device.
Figure 5A:
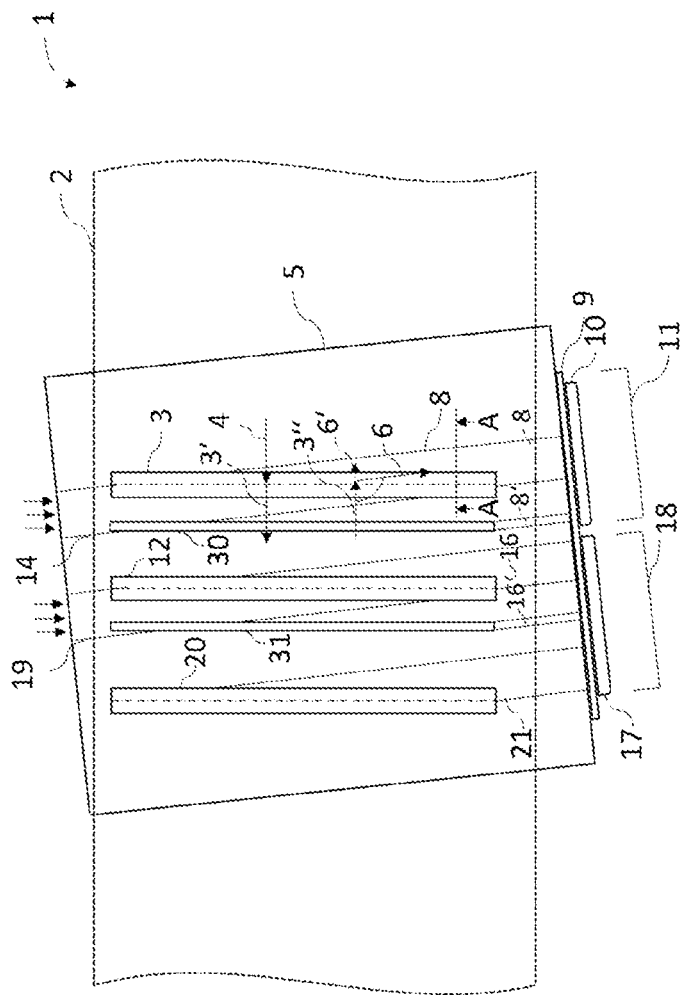

FIGS. 5A and 5B intended to serve for better understanding of the relative arrangements between the conveyor belt 2 and the components of the cleaning device 1 that are shown in FIG. 4. For better clarity, the cleaning device 1 is reduced to some of the components shown in FIG. 4, with the same reference signs being used for the remaining components.

As already explained with respect to FIG. 4, the conveyor belt 2 shown FIG. 5A in the contact region with the first roller 3 is in a translation movement with a superficial conveyor belt speed in the translation direction 4. The first roller 3, the second roller 12 and the drying roller 20 are oriented with their respective longitudinal axes substantially orthogonally to the conveyor belt speed 4.

At the contact between the conveyor belt 2 and the first roller 3, the conveyor belt speed in the translation direction 4 and the tangential speed 3' of the first roller 3 run in parallel and are directed in the same direction. The tangential speeds (not shown) of the second roller 12 and of the drying roller 20 are likewise directed in parallel and in the same direction as the conveyor belt speed in the translation direction 4.

As likewise already explained with respect to FIG. 4, the cleaning belt 5 is in a conveying movement in the contact region with the first roller 3 and has a superficial cleaning belt speed which is oriented along the main conveying direction 6.

At the contact between the cleaning belt 5 and the first roller 3, the conveying speed of the cleaning belt has a speed portion 6'. Furthermore, the first roller 3 has a superficial tangential speed 3" at the contact with the cleaning belt 5. At the contact between the cleaning belt 5 and the first roller 3, the speed portion 6' and the tangential speed 3" run in parallel and are directed in the same direction with respect to each other. The tangential speeds (not shown) of the second roller 12 and of the drying roller 20 at their respective contacts with the cleaning belt 5 are likewise directed in parallel and in the same direction as the speed portion 6'.

The sectional illustration A-A in FIG. 5B shows the orientations of the tangential speed 3' that are described with respect to FIG. 4 in relation to the conveyor belt speed in the translation direction 4 at the contact between the first roller 3 and the conveyor belt 2. The sectional illustration in FIG. 5B likewise shows the orientations of the tangential speed 3" in relation to the speed portion 6' of the cleaning belt speed 6 at the contact between the first roller 3 and the cleaning belt 5.

In addition, it is shown with reference to the sectional illustration A-A of FIG. 5B that the path 8' arises by the quantity of first solvent scraped off by the first cleaning doctor blade 30 and coating agent residues being placed onto the cleaning belt and being conveyed away in the main conveying direction. Alternatively to the arrangement shown schematically here of the first cleaning doctor blade 30, the latter can be arranged in relation to the first roller 3 in such a manner that the quantity of first solvent scraped off by it and coating agent residues are not placed onto the cleaning belt 5, but rather onto the first roller 3. As a result, said scraped-off quantity of first solvent and coating agent residues can be conveyed between the cleaning belt 5 and the first roller 3 as a consequence of the rotational movement of the first roller 3 and can be conveyed to the conveyor belt by means of the rotational movement of the first roller 3.

The invention claimed is:

1. A cleaning device (1) for an endlessly revolving conveyor belt (2) contaminated with coating agent residues, the cleaning device comprising:
   a first roller (3) arranged below the conveyor belt (2) such that a lateral surface of the first roller (3) is in contact with a lower strand of the conveyor belt (2);
   an endlessly revolving cleaning belt (5) arranged below the first roller (3);
   the lateral surface of the first roller (3) contacts an upper strand of the cleaning belt (5);
   the cleaning belt (5) has a main conveying direction (6) during a conveying movement on an upper strand and is arranged such that the upper strand is tilted relative to the main conveying direction (6) in relation to a longitudinal axis of the first roller (3);
   at least one first dispensing device (13, 13') located at least one of on or above the cleaning belt (5) that is arranged to feed a first solvent onto the cleaning belt (5) such that the first solvent is adapted to be conveyed by a conveying movement of the cleaning belt (5) along the main conveying direction (6) into a region in which the cleaning belt (5) contacts the first roller (3); and
   the first roller (3) is configured such that, by a rotational movement thereof, said first roller at least partially picks up the first solvent located on the cleaning belt (5) and dispenses the solvent onto the conveyor belt (2).

2. The cleaning device (1) as claimed in claim 1, wherein the rotational movement of the first roller (3) is oriented such that, in the region of contact with the conveyor belt (2), the first roller (3) has a superficial tangential speed (3') which is at least partially directed in a same direction as a translation direction (4) of the conveyor belt (2) at the lower strand thereof.

3. The cleaning device (1) as claimed in claim 1, wherein the first solvent comprises a coating agent, the residues of which are intended to be eliminated from the conveyor belt (2).

4. The cleaning device (1) as claimed in claim 1, further comprising a first cleaning element (30) configured for frictional contact with the conveyor belt (2) and, as seen in the translation direction of the conveyor belt (2) at the lower strand, is arranged downstream of the first roller (3) and is adapted to at least partially scrape off the first solvent placed onto the conveyor belt (2) by the first roller (3) and the coating agent residues located on the conveyor belt (2) from the conveyor belt (2) and to guide them such that they pass onto the cleaning belt (5).

5. The cleaning device (1) as claimed in claim 4, further comprising a collecting device arranged downstream of at least one of the first roller (3) or the first cleaning element (30), as seen in the main conveying direction (6) of the cleaning belt (5), the collecting device is configured to at least partially collect a quantity of the first solvent and coating agent residues transported by the cleaning belt from the cleaning belt and to guide them into a first tank.

6. The cleaning device (1) as claimed in claim 5, wherein the collecting device has at least one of a removal doctor blade (9) or a removal roller in frictional contact with the cleaning belt (5).

7. The cleaning device (1) as claimed in claim 6, further comprising at least one guiding element which comprises a funnel (10) arranged between at least one of the removal doctor blade (9) or the removal roller and the first tank (11) in order to guide the first solvent and coating agent residues picked up from the cleaning belt (5) into the first tank (11).

8. The cleaning device (1) as claimed in claim 5, wherein the first dispensing device (13, 13') is connected to the first tank (11) via a first pump (23) and is configured to place the first solvent and coating agent residues from the first tank (11) onto the cleaning belt (5).

9. The cleaning device (1) as claimed in claim 1, further comprising:
a second roller (12) that, as seen in the translation direction of the conveyor belt (2) at the lower strand, is arranged downstream of the first roller (3) and below the conveyor belt, and a lateral surface of the second roller (12) contacts the lower strand of the conveyor belt (2), and the cleaning belt (5) is also arranged below the second roller (12) and the lateral surface of the second roller (12) contacts the upper strand of the cleaning belt (5), the second roller (12) is arranged tilted with a longitudinal axis thereof in relation to the main conveying direction (6) of the cleaning belt (5); and
a second dispensing device (13") at least one of on or above the cleaning belt configured to feed a second solvent onto the cleaning belt (5) such that the second solvent is conveyed by the conveying movement of the cleaning belt (5) along the main conveying direction (6) into a region in which the cleaning belt (5) is in contact with the second roller (12);
wherein the second roller (12) is configured, by a rotational movement thereof, to at least partially pick up the second solvent located on the cleaning belt (5) and to dispense the second solvent onto the conveyor belt (2); and
the rotational movement of the second roller (12) is oriented in a corresponding or opposed manner with respect to the rotational movement of the first roller (3).

10. The cleaning device as claimed in claim 9, wherein the second solvent differs from the first solvent.

11. The cleaning device as claimed in claim 10, wherein the second solvent comprises a cleaning agent.

12. The cleaning device (1) as claimed in claim 9, further comprising a second cleaning element (31) configured for frictional contact with the conveyor belt (2) that, as seen in the translation direction of the conveyor belt (2) at the lower strand, is arranged downstream of the second roller (12) and is configured to scrape off at least a quantity of the second solvent placed onto the conveyor belt (2) by the second roller (12).

13. The cleaning device (1) as claimed in claim 12, wherein the second roller (12) is configured to scrape off at least one of the first solvent or coating agent residues not scraped off by the first cleaning element (30) from the conveyor belt (2) and to guide them such that they pass onto the cleaning belt (5).

14. The cleaning device (1) as claimed in claim 13, wherein the collecting device, as seen in the main conveying direction (6) of the cleaning belt (5), is arranged downstream of at least one of the second roller (12) or the second cleaning element (31) and is configured to at least partially collect a quantity of the second solvent transported by the cleaning belt (5) from the cleaning belt (5) and to guide the quantity of the second solvent into a second tank.

15. The cleaning device (1) at least as claimed in claim 14, wherein the second dispensing device (13") is connected to the second tank (18) via a second pump (23') in order to convey at least the second solvent out of the second tank (18) and to place the second solvent onto the cleaning belt (5).

16. The cleaning device (1) as claimed in claim 9, further comprising a drying roller (20) arranged, as seen in the translation direction of the conveyor belt (2) at the lower strand, below the conveyor belt (2) downstream of at least one of the first roller (3) or the second roller (12), and a lateral surface of the drying roller (20) contacts the lower strand of the conveyor belt (2), the cleaning belt (5) is also arranged below the drying roller (20), and the lateral surface of the drying roller (20) is in contact with the upper strand of the cleaning belt (5), and the drying roller (20) is configured, by a rotational movement thereof, to pick up at least the second solvent located on the conveyor belt (2) and to dispense the second solvent onto the cleaning belt (5).

17. A coating device comprising:
an endlessly revolving conveyor belt (2) for receiving at least one workpiece;
at least one coating unit for superficial application of a coating agent onto the workpiece;
a cleaning device (1) having at least one first roller (3) which is arranged below the conveyor belt (2) and a lateral surface of which is in contact with a lower strand of the conveyor belt (2), and an endlessly revolving cleaning belt (5) which is arranged below the first roller (3);
the lateral surface of the first roller (3) contacts an upper strand of the cleaning belt (5);
the cleaning belt (5) has a main conveying direction (6) during a conveying movement on the upper strand and is arranged such that the cleaning belt is tilted relative to the main conveying direction (6) in relation to a longitudinal axis of the first roller (3);

a first dispensing device (13, 13') at least one of on or above the cleaning belt (5) configured to feed a first solvent onto the cleaning belt (5) such that the first solvent is conveyed by the conveying movement of the cleaning belt (5) along the main conveying direction (6) into a region in which the cleaning belt (5) is in contact with the first roller (3); and the first roller (3) is configured and arranged such that, by a rotational movement thereof, said first roller at least partially picks up the first solvent located on the cleaning belt (5) and dispenses the first solvent onto the conveyor belt (2).

18. A method for cleaning an endlessly revolving conveyor belt contaminated with coating agent residues, the method comprising:

arranging a first roller (3) below the conveyor belt (2) such that a lateral surface of the first roller (3) contacts a lower strand of the conveyor belt (2);

arranging an endlessly revolving cleaning belt (5) below the first roller (3);

arranging the cleaning belt (5) below the first roller (3) such that the lateral surface of the first roller (3) contacts an upper strand of the cleaning belt (5), with the cleaning belt (5) being tilted with a main conveying direction (6) relative to a longitudinal axis of the first roller (3);

placing a solvent onto the upper strand of the cleaning belt (5) and conveying the solvent by a conveying movement of the cleaning belt (5) along the main conveying direction (6) into a region in which the cleaning belt (5) contacts the first roller (3); and setting the first roller (3) into a rotational movement thereby picking up the solvent located on the cleaning belt (5) and dispensing the solvent onto the conveyor belt (2).

\* \* \* \* \*